June 29, 1965 A. HEY ETAL 3,192,091
METHOD OF SEALING A CONTAINER
Filed Aug. 1, 1960 2 Sheets-Sheet 1
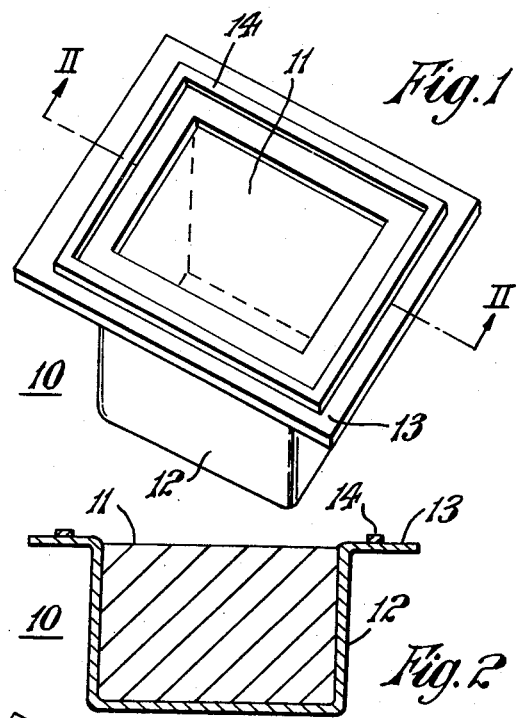
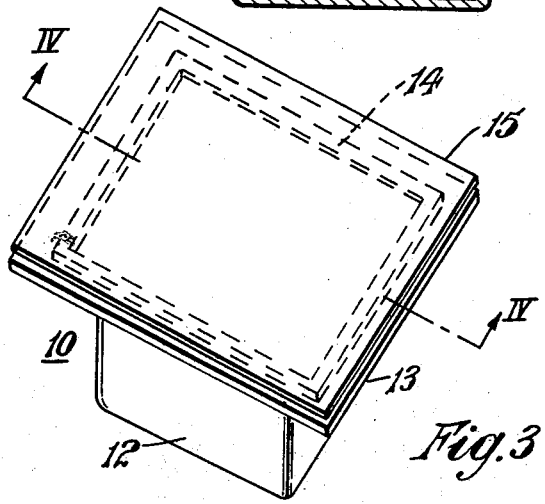
INVENTORS
Arie Hey, Johannes Brouwer, Alexander B. Otter
by Brumbaugh, Free, Graves & Donohue, Attorneys.

June 29, 1965 A. HEY ETAL 3,192,091
METHOD OF SEALING A CONTAINER
Filed Aug. 1, 1960 2 Sheets-Sheet 2

INVENTORS
Arie Hey, Johannes Brouwer, Alexander B. Otter
by Brumbaugh, Free, Graves & Donohue, Attorneys.

3,192,091
METHOD OF SEALING A CONTAINER
Arie Hey, Etten, Johannes Brouwer, Pijnacker, and Alexander Benjamin Ottow, Rotterdam, Netherlands, assignors to Lever Brothers Company, New York, N.Y., a corporation of Maine
Filed Aug. 1, 1960, Ser. No. 46,421
Claims priority, application Great Britain, Aug. 13, 1959, 27,715/59
3 Claims. (Cl. 156—247)

This invention relates to packaging and in particular to a method of manufacturing containers by welding parts of the containers together by heat and pressure.

It is an object of the invention to provide a method of manufacturing an hermetically sealed container which can be readily opened by pulling apart the parts constituting the container, thereby avoiding the use of scissors or other tools, and which cannot be re-closed subsequently by simply pressing the parts together and is, therefore, pilferproof.

According to the present invention there is provided a method of manufacturing an hermetically sealed container comprising parts of thermoplastic material, which container can be readily opened by hand by pulling apart the thermoplastic container parts, which method comprises forming between the parts to be sealed an intermediate layer comprising a mixture of a thermoplastic bonding material and a particulate filler and applying heat and pressure to form an hermetic seal, the intermediate layer being such that it readily parts within itself on pulling apart the parts of the sealed container. The intermediate layer will readily part within itself if the filler is chosen so that it effectively produces points of weakness in the thermoplastic material of the intermediate layer, which weaknesses may be due to the weakness of the bond between the filler and the thermoplastic bonding material (the strength of the bond between the filler and the thermoplastic being less than the strength of the thermoplastic); or it may be due to the weakness of the filler particles themselves, the filler particles fracturing on pulling apart the container parts (and this will occur when the strength of the filler particles is less than the strength of the thermoplastic bonding material and that of the bond between the bonding material and the filler particles); or it may be due to a combination of these factors.

The intermediate layer comprising the thermoplastic bonding material and the filler may be applied in the form of a thin sheet or strip or may be a dispersion which can be applied to one of the parts to be welded together by engraved rollers. It is also possible to use a solution of the thermoplastic bonding material in which the filler is dispersed, but any solvent which penetrates into the thermoplastic container parts should be removed prior to the sealing operation.

Useful thermoplastic bonding materials are, for example, polystyrene, polyvinyl acetate, polyethylene and, in particular, those comprising polyacrylic esters. It will be evident that the bonding material must be compatible with the thermoplastic material or materials of the container parts to be welded.

The filler has preferably a laminated structure and is preferably used in finely-divided form, the particle size of the order of not more than 20 microns being preferred.

Suitable fillers are chalk, asbestos, silica, and diatomaceous earth (kieselguhr) and especially the following fillers having a laminated structure: mica, kaolin and bentonite. Satisfactory results have also been obtained using as filler precipitated calcium carbonate coated with a calcium salt of a fatty acid. The choice and particle size of the filler depends on the requirements the weld has to meet. A mixture of 2.0 parts of Acronal 500-D (which is an aqueous dispersion of mixed polymers of acrylic acid esters with other vinyl compounds having 40-50% solid matter) constituting the thermoplastic bonding material and 1 part of Micro Mica W-20 Microns (which is a powdered mica, the particles having a maximum dimension of 20 microns) constituting the filler, has been found to be particularly useful. Useful results have also been obtained by using amounts of, for example, 0.2 and 0.5 part by weight of the filler for each part by weight of the adhesive.

Any suitable form of heating can be employed, for example high frequency heating, impulse heating or heated sealing jaws.

It is desirable, especially if impulse heating or heated sealing jaws are employed, that the melting point of the bonding material is below that of the container parts.

An embodiment of the invention will now be described, by way of example, with reference to the accompanying diagrammatic drawings, in which:

FIGURE 1 shows a perspective view of a flanged dish-shaped container containing a food product, the flange of the container having applied thereto an adhesive composition;

FIGURE 2 shows a cross-sectional view along the line II—II of FIGURE 1;

FIGURE 3 shows in perspective the container of FIGURE 1 to which a cover has been hermetically sealed;

Figure 4:
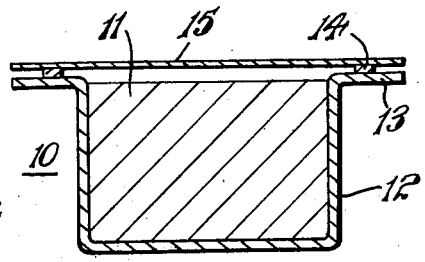
FIGURE 4 shows a cross-sectional view along the line IV—IV of FIGURE 3.

Referring to FIGURE 1, this shows a container part 10 made of unplasticised polyvinyl chloride containing a foodstuff 11 such as margarine. The container part 10 comprises a main receptacle portion 12 having a flange 13 extending outwardly from its upper edge. To a central region of the flange 13 is applied a layer 14, in the form of a narrow strip, of an adhesive composition consisting of an intimate mixture of a thermoplastic adhesive and a particulate filler. Particularly suitable constituents of the adhesive composition are the thermoplastic adhesive known under the name Acronal 500-D and the filler known as Micro Mica W-20 Microns; the preferred composition is 20 parts by weight of the adhesive and 10 parts by weight of the filler. The adhesive composition is preferably applied with the aid of a doctor knife to give a layer of uniform thickness and which, when dry, has a weight of about 4-5 grams per square metre.

After the application of the adhesive layer, a second container part in the form of a cover 15 of thermoplastic material is placed over the adhesive layer 14 on the flange 13 of the other container part 10 (see FIGURES 3 and 4) and heat and pressure are applied, for example by heated sealing jaws, to form an hermetic seal. During the heat-sealing operation the thermoplastic material of the intermediate adhesive layer 14 is bonded to each of the thermoplastic parts and also to the particulate filler of the adhesive layer. The thermoplastic of the cover 15 in this embodiment is the same as that of the flanged receptacle part 10. The sealed container produced is sufficiently rigid to maintain its shape with normal handling.

Figure 5:
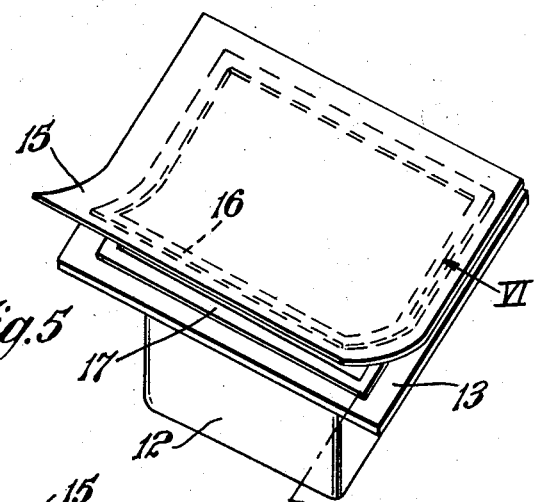
FIGURE 5 shows in perspective the container of FIGURE 3 partly opened by peeling back the cover.
Figure 6:
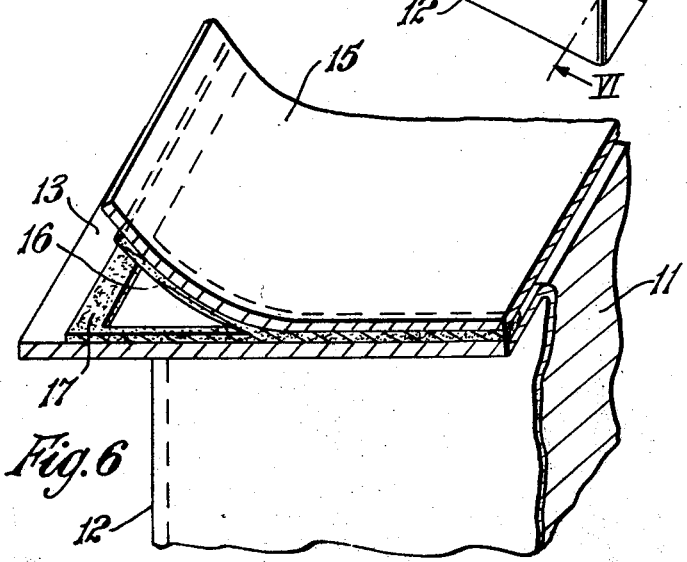
FIGURE 6 shows an enlarged fragmentary perspective view of the container illustrated in FIGURE 5 partly in section along the line VI—VI of FIGURE 5.

Although the heat sealing operation results in an hermetically sealed container, the container parts 10 and 15 can be readily and smoothly separated by hand without damaging them by peeling back the cover 15 as shown in FIGURES 5 and 6. The intermediate layer 14 parts in its thickness as the cover is peeled back leaving a part 16 of the adhesive composition on the cover sheet 15 and a part 17 on the flange 13. This ease of separation is obtained because the strength of the intermediate layer 14 is considerably less than that of the thermoplastic material itself, i.e. less than the strength of a similar layer from which filler has been excluded, and furthermore is less than the strength of the container parts 10 and 15. Also the strength of the bond between the thermoplastic material of the intermediate layer 14 and the thermoplastic container parts 10 and 15 is greater than the strength of the intermediate layer 14. Examination of the parted bonding layer shows that particles of the filler have fractured into two, one portion being found in part 16 of the cleaved adhesive layer and the remaining portion in part 17.

If desired an extra layer of the thermoplastic material of the bonding layer may be applied to the adhesive layer 14 before cover 15 is provided and the heat-sealing operation carried out.

Other specific adhesive compositions which give good results are, for example, those employing 8, 6 and 3 parts of the filler instead of 10 parts as described above, and also those constituted by 15 parts by weight of the adhesive and 6 and 9 parts of the filler, respectively.

Good results may also be obtained by employing the adhesive known as Acronal 300–D (which is also a 40–50% aqueous dispersion of mixed polymers of acrylic acid esters with other vinyl compounds but has a degree of polymerization higher than that of Acronal 500–D) as the thermoplastic material of the bonding layer, equal parts by weight of this adhesive and the filler being preferably used; however, 0.3 and 0.6 part by weight of the filler per part of adhesive also give satisfactory results. Satisfactory results have also been obtained using, for example, 15 and 25 parts by weight of this adhesive with 6 and 9 parts, respectively, of the filler.

Satisfactory results have also been obtained by using Acronal 300–D, Acronal 500–D and polyvinyl acetate as the adhesive with a filler consisting of precipitated calcium carbonate coated with a calcium salt of a fatty acid, 0.2 to 0.5 part, for example, by weight of filler being used per part by weight of adhesive.

In the manner described above containers of thermoplastic material are obtained which, although hermetically sealed, are none-the-less easy to open by hand by the user without recourse to scissors or other tools. Furthermore, the seal cannot subsequently be re-established by merely pressing the parts together by hand so that a pilfer-proof pack is obtained.

What is claimed is:

1. The method of making a hermetically-sealed container from two complementary container parts of thermoplastic material said container parts having opposed faces to be bonded together, which comprises applying to at least one of said opposed faces a layer of bonding material comprising a mixture of a thermoplastic adhesive and a particulate filler selected from the group consisting of chalk, asbestos, silica, diatomaceous earth, mica, kaolin, bentonite and precipitated calcium carbonate coated with a calcium salt of a fatty acid, said filler being present in an amount of about 0.2 to 1.0 part by weight for each part of thermoplastic adhesive, and heating and pressing said faces against said layer to weld said faces to said layer, said filler weakening said layer to cause said layer to cleave within itself when forces are applied to said parts to pull them apart with one portion of the layer being on one opened part and with the remaining portion of the layer being on the other opened part, the bonding layer and complementary container parts being compatible so that the layer is integrally welded to the parts when heat and pressure is applied thereto.

2. The method according to claim 1 wherein said adhesive is selected from the group consisting of polystyrene, polyvinyl acetate, polyethylene and polyacrylic esters.

3. The method of making a hermetically-sealed container from two complementary container parts of thermoplastic material said container parts having opposed faces to be bonded together and opening subsequently the sealed container which comprises applying to at least one of said opposed faces a layer of bonding material comprising a mixture of a thermoplastic adhesive and a particulate filler selected from the group consisting of chalk, asbestos, silica, diatomaceous earth, mica, kaolin, bentonite and precipitated calcium carbonate coated with a calcium salt of a fatty acid, said filler being present in an amount of about 0.2 to 1.0 part by weight for each part of thermoplastic adhesive; heating and pressing with heated sealing jaws said faces against said layer to weld said faces to said layer, said filler weakening said layer to cause said layer to cleave within itself when forces are applied to said parts to pull them apart, the bonding layer and complementary container parts being compatible so that the layer is integrally welded to the parts when heat and pressure is applied thereto; and pulling apart said sealed two container parts to open the container with one portion of the layer being on one opened part and the remaining portion of the layer being on the other opened part.

References Cited by the Examiner

UNITED STATES PATENTS

| | | | |
|---|---|---|---|
| 2,622,053 | 12/52 | Clowe et al. | 161—115 |
| 2,649,392 | 8/53 | Marshall | 154—83 |
| 2,781,159 | 2/57 | Copeman | 229—51 |
| 2,932,385 | 4/60 | Bollmeier et al. | 206—47 |
| 2,954,915 | 10/60 | Poepper | 229—66 |
| 2,990,948 | 7/61 | Zackheim | 206—63.2 |
| 3,069,273 | 12/62 | Wayne | 229—51 |

THERON E. CONDON, *Primary Examiner.*

CARL F. CRAFFT, EARL J. DRUMMOND, *Examiners.*